United States Patent [19]

Lund

[11] 4,231,495
[45] Nov. 4, 1980

[54] ROTARY FEEDER FOR PNEUMATIC CONVEYING LINE

[75] Inventor: Arvid Lund, North Vancouver, Canada

[73] Assignee: Rader Companies, Inc., Portland, Oreg.

[21] Appl. No.: 880,714

[22] Filed: Feb. 23, 1978

[51] Int. Cl.³ ............................................. G01F 11/10
[52] U.S. Cl. .................................... 222/345; 222/368; 241/222
[58] Field of Search ....................... 222/194, 345, 368; 214/17 CC; 302/49; 241/222, 242, 223

[56] References Cited
U.S. PATENT DOCUMENTS

| | | | |
|---|---|---|---|
| 1,143,634 | 6/1915 | Lane et al. ........................ | 222/345 X |
| 2,858,212 | 10/1958 | Durant et al. ..................... | 222/194 X |
| 3,026,828 | 3/1962 | Sabaitis ............................. | 222/345 X |
| 3,052,383 | 9/1962 | Transeau ........................... | 222/345 |
| 3,201,007 | 8/1965 | Transeau ........................... | 222/345 |
| 4,076,150 | 2/1978 | Didrickson ........................ | 302/49 X |

Primary Examiner—David A. Scherbel
Attorney, Agent, or Firm—Klarquist, Sparkman, Campbell, Leigh, Hall & Whinston

[57] ABSTRACT

A rotary air-lock feeder for a pneumatic conveying line includes the cylindrical housing with a straight bladed rotor mounted therein to propel materials from an upper inlet to a bottom discharge. The edges of the blades are positioned in close association with housing wall to prevent escape of air from the conveying line through feeder. A shear knife is mounted in housing with inner surface conforming to curvature of housing and a flat top surface intersecting inner surface to form a sharp cutting edge so as to shear material projecting beyond outer edge of rotor blades to prevent binding thereof between such outer edge and the housing wall.

4 Claims, 6 Drawing Figures

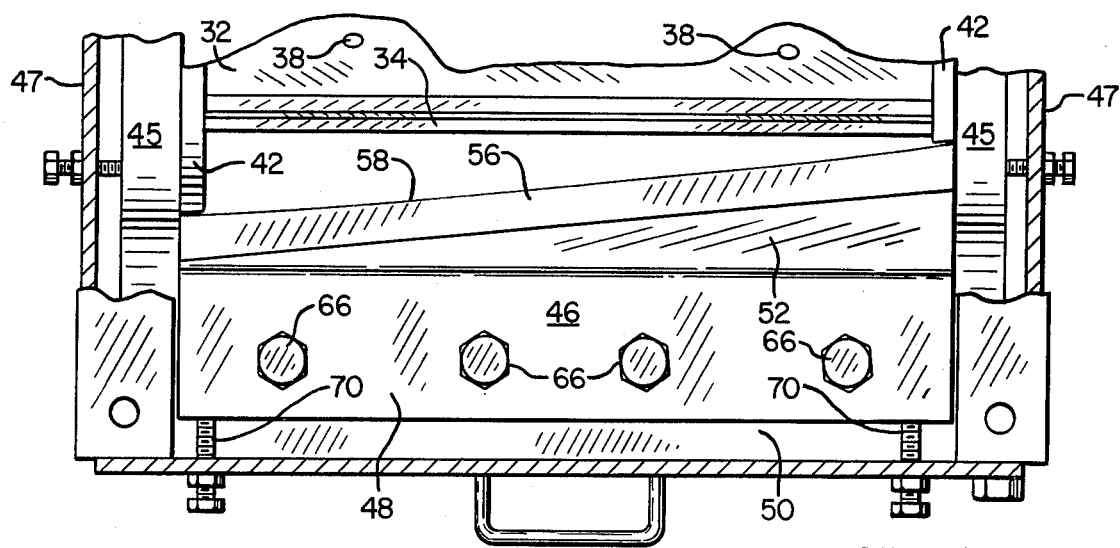
FIG. 3
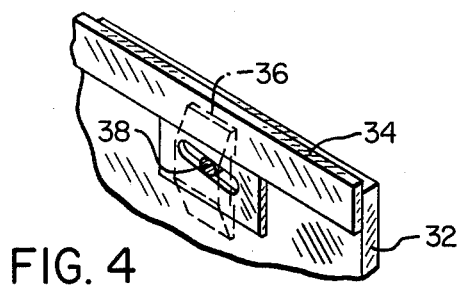
FIG. 4
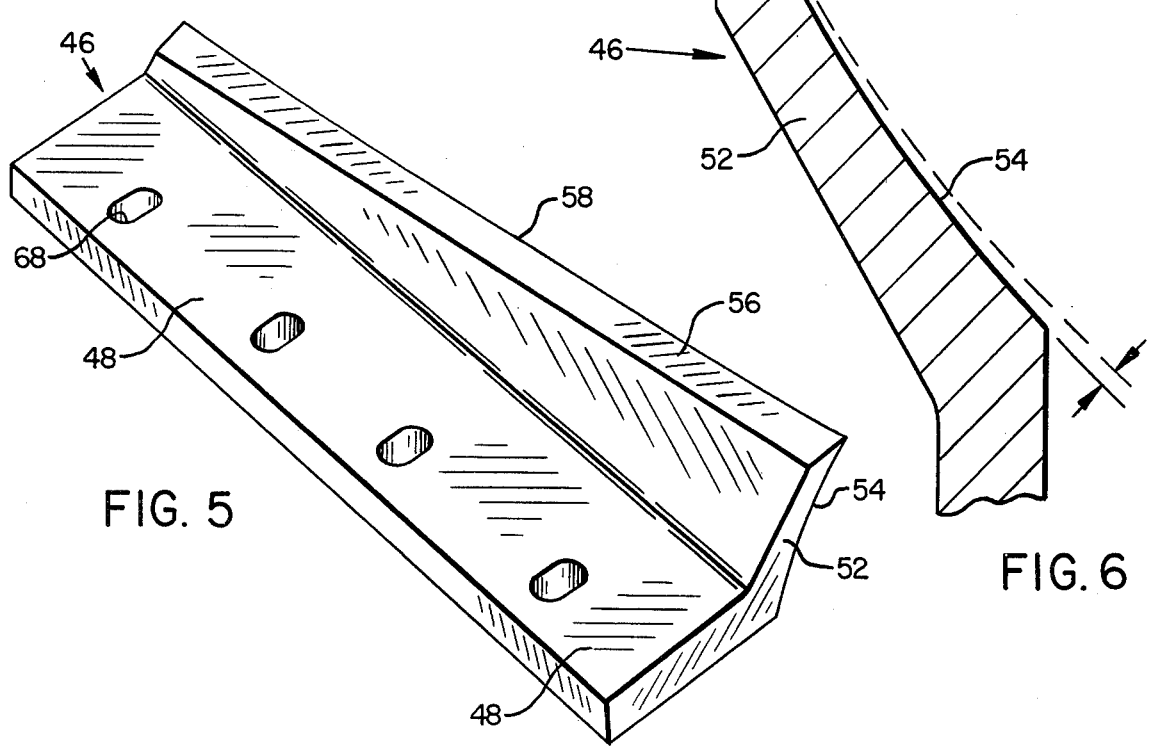
FIG. 5
FIG. 6

ROTARY FEEDER FOR PNEUMATIC CONVEYING LINE

BACKGROUND OF THE INVENTION

Many materials, such as wood chips, grain, shredded garbage, and like divided materials, are conveniently conveyed by entraining the same in the air-stream of a pneumatic conveying line. To prevent the escape of air into or out of such conveying line, the divided material is commonly fed into the line by means of a rotary air-lock device. Typically, such devices have comprised a cylindrical housing mounted over a conveying line and formed with an outlet opening directly into the line. Mounted in the housing is a rotor comprising a plurality of helically shaped blades adapted to engage the periphery of the housing and to form with the housing as they rotate sealed chambers for conveying material from an upper inlet to the outlet. The upper edge of the housing is provided with a shearing knife which, with the edge of a rotor blade, forms a shear to cut off material projecting beyond the edge of a rotor blade as it rotates beneath the knife. This is done to protect the housing wall from abrasion by such material or binding by the same. Periodically, the rotor blades must be sharpened. This has required dismantling of the housing and removal of the blades.

SUMMARY OF THE INVENTION

It is an object of the present invention to provide a feeder construction having a new and novel shear knife and blade arrangement which simplifies sharpening of the blade and the knife.

More particularly, it is an object of the invention to provide feeder construction wherein the knife and the blade edges may be sharpened without disassembly of the feeder.

In accordance with the illustrated embodiment of the invention, a rotary air-lock feeder is provided including a cylindrical housing having a top inlet and a bottom outlet. Mounted in the housing is a rotor having a plurality of radially and axially extending planar, straight edged rotor blades adapted to sweep the walls of the housing as the rotor rotates. Mounted on the housing for engagement with the edges of the rotor blades as they rotate past the inlet is a shear knife. The shear knife is provided with an arcuate inner surface which is substantially concentric with the housing axis and with the planar top surface which together define a sharp cutting edge. The planar top surface lies in a plane defined by two perpendicular intersecting lines, one of which is horizontal and perpendicular to a vertical plane through the housing axis. The other of such lines is inclined at an angle to the horizontal whereby the sharp edge of the shear knife defines a helix against which the edge of a rotor blade sweeps in a scissor-like action to shear any material projecting beyond the rotor blade edge.

DRAWINGS

FIG. 3 is a top fragmentary view of the feeder;

FIG. 4 is a perspective view of a portion of a rotor blade showing details of construction thereof;

FIG. 5 is a perspective view of the shear knife of the invention showing details thereof;

FIG. 6 is an enlarged fragmentary section of the shear knife of the invention.

DETAILED DESCRIPTION OF THE INVENTION

Figure 1:
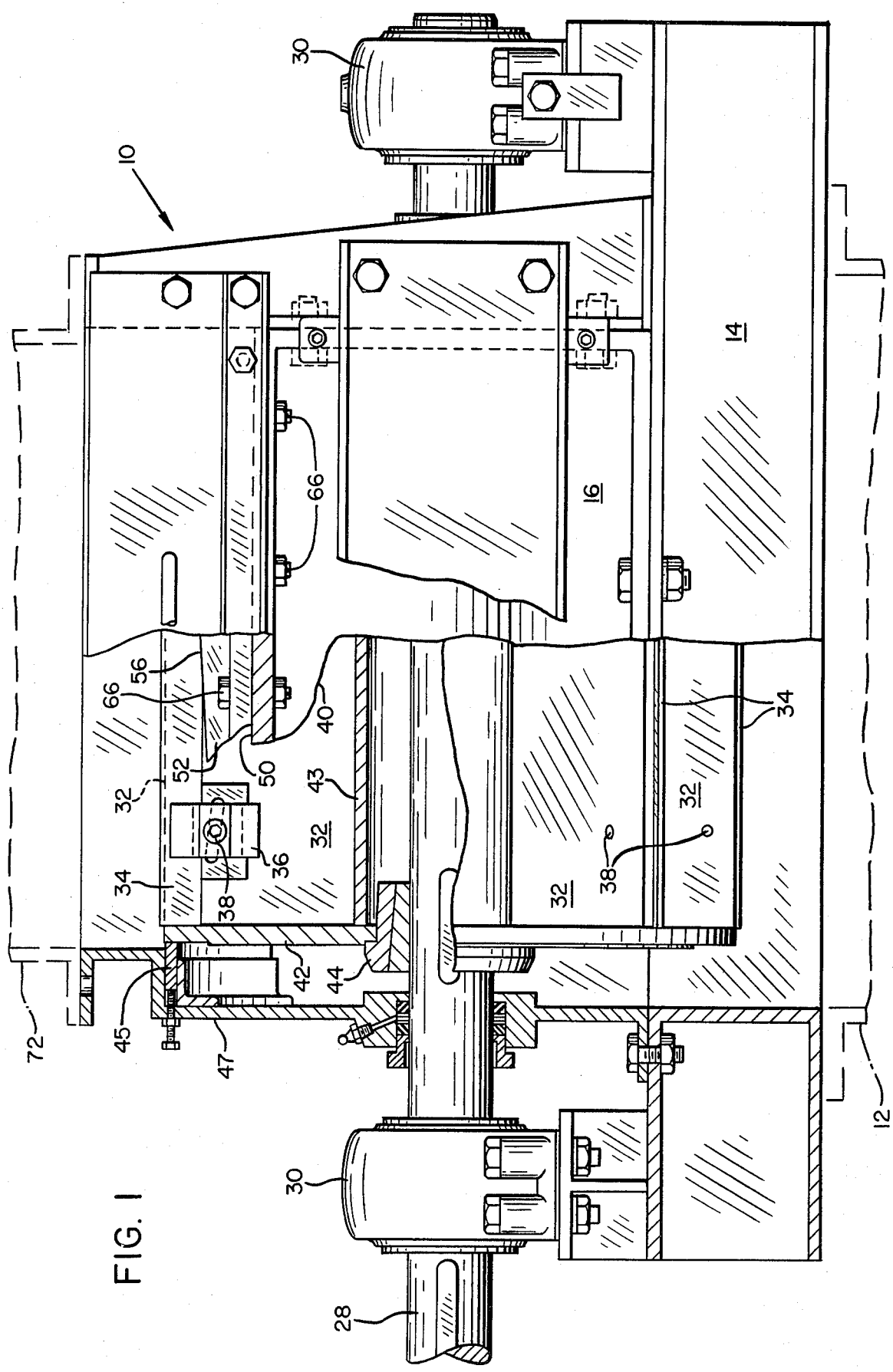
FIG. 1 is a side elevation of a feeder constructed in accordance with the invention, with parts thereof broken away to show details of the feeder.
Figure 2:
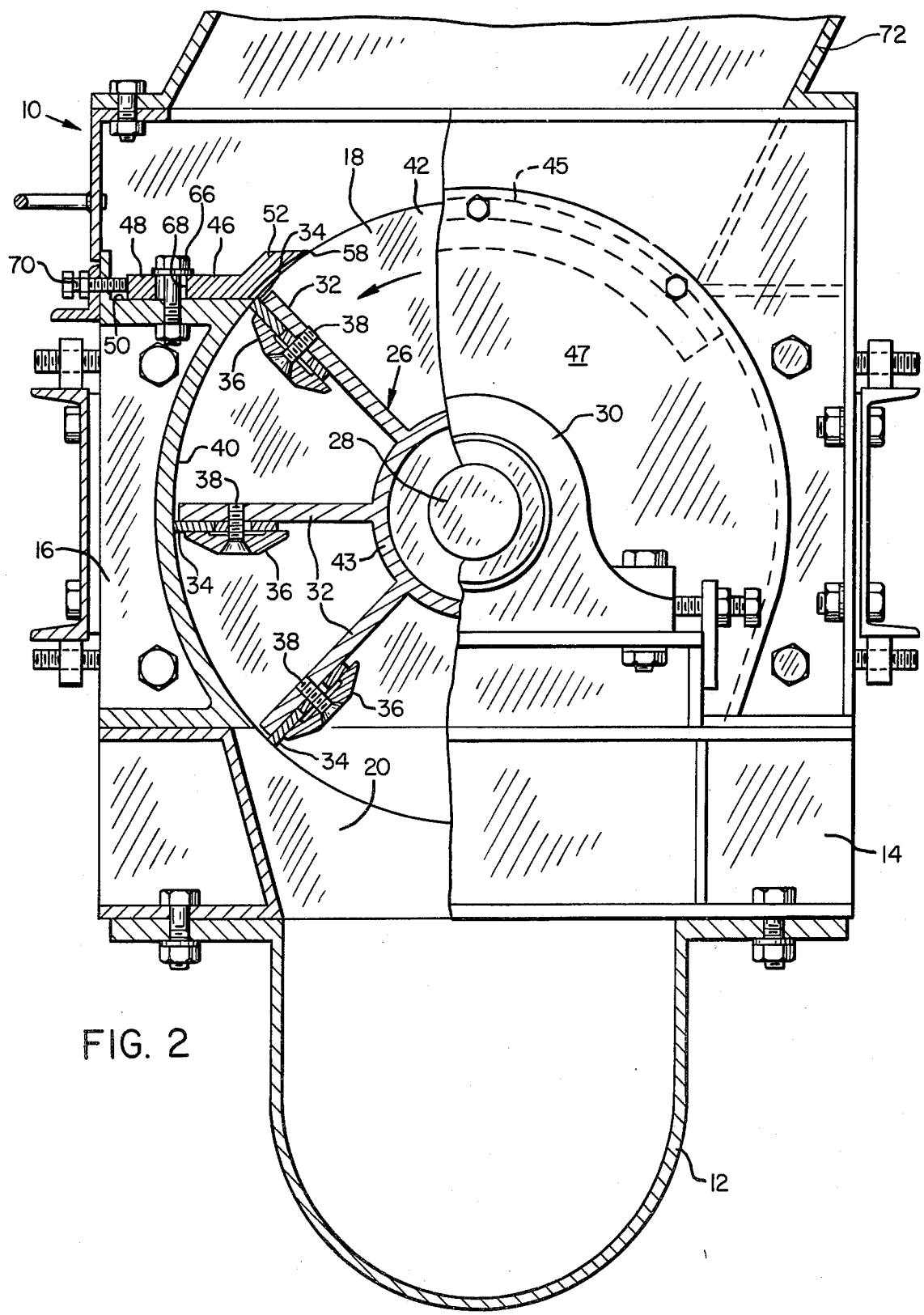
FIG. 2 is an end elevation of the feeder, with parts broken away to show details thereof and its arrangement with a pneumatic conveying line.

Referring now to the drawings, the feeder of the invention is shown in FIG. 1 at 10 and is adapted to be mounted over a pipeline 12 (see FIG. 2) of a pneumatic conveying system. The pipeline is connected to a conventional blower (not shown) to cause flow of air therethrough so as to convey particulate material in the airstream through the line. The feeder 10 includes a base 14 upon which a cylindrical housing 16 is mounted. The housing is formed with an inlet 18 at its top and an outlet 20 at its bottom which opens to the pipeline 12. Mounted within the housing 16 is a rotor 26 which is fixed to a shaft 28 journaled in bearings 30 which are supported upon the base 14. The shaft 28 is adapted to be connected to a suitable driving force so as to rotate the rotor in the direction of the arrow in FIG. 2.

The rotor 26 is provided with a plurality of planar blades 32, which extend radially of the rotor and parallel to the axis thereof. The outer edges of the blades 32 are straight and extend parallel to the axis of the rotor. Preferably such edges are defined by adjustable and replaceable tip members 34 which are adjustably clamped in place by clamps 36, held in place by set screws 38 threaded into appropriate threaded openings in the blades 32. The tip members 34 are of rectangular configuration. The opposite longitudinal edges of the tip members are at right angles to the opposite faces, and they are adapted to be mounted on the blades 32 with such edges extending parallel to the axis of the rotor and in close proximity to the inner periphery 40 of the housing 16.

The blades 32 are mounted between rotor end plates 42 and are fixed at their inner edges to a hub 43, which is supported coaxially of the shaft 28 by collars 44. Material is fed to the feeder through an inclined chute 72. The end plates 42 and the blades 32 form pockets for conveying material from the top inlet of the feeder to the bottom outlet 20 where it can drop into the conveying line 12. The engagement of the ends of the blades 32, i.e., the tip members 34, with the housing walls 40 prevents the passage of air to or from the conveying line 12. Under some conditions of operation, the conveying line 12 would be under pressure above atmosphere and on other conditions it would be under a negative pressure, depending upon where the blower effecting movement of air through the line 12 is located. Other seals, such as rotary seals 45, may be provided to form a seal between the end plates 42 and the adjacent housing end plates 47.

Mounted on the housing 16 is a shear knife 46. The shear knife is provided with a base portion 48 which is adapted to seat upon a seating surface 50 formed on the housing 16. The shear knife 46 also includes a body portion 52 having an arcuate inner surface 54 which is substantially concentric with the axis of the rotor and the housing but is slightly eccentric therefrom as will be explained in greater detail below. The body portion 52 is also provided with a planar top surface 56 which, in the mounted position of the knife, is horizontal when viewed in cross section, see FIG. 2, but which slopes downwardly from one end to the other when viewed in elevation, see FIG. 1. That is to say, the top surface 56 lies in the plane defined by two perpendicular intersecting lines, one of which is horizontal and perpendicular to a vertical plane through the housing and rotor axis, the other said lines being inclined at an acute angle to the horizontal. The surfaces 54, 56 define a helical sharp edge 58. The shear knife is mounted on the housing 16 with the edge 58 extending parallel to the axis of rotation of the rotor 26 and closely adjacent to the path 60 of the outer edges of the blade tip members 34, see FIG. 6. To permit adjustment of the position of the shear knife 46, it is mounted on the housing 16 by means of fastening screws 66, extending through slots 68 in the knife base 48 and threaded into the housing 16. As will be apparent, as the tip members 34 rotate past the edge 58, a scissor-like action occurs to shear any material extending past the edge of the tip member.

As mentioned previously, the inner surface 54 of the blade 46 is substantially concentric with the axis of the rotor 26 but is preferably positioned so as to be at a progressively greater distance from the edge 58 in the direction of rotation of the blades 32 as best shown in FIG. 6, thus to provide a slight amount of clearance for the tip members as they rotate. Adjusting screws 70 may be provided to help adjust the position of the shear knife 46.

As will be apparent, the shear knife can be easily sharpened by grinding the top surface 56 thereof through the inlet opening of the feeder. Likewise, the edges of the rotor blades or tip members 34 may be ground while they are in position upon the rotor. Moreover, it will be apparent that a tip member 34 can be easily removed and remounted on a blade 32 to present a new sharp corner eliminating any necessity for grinding the edge while the unit is mounted. Furthermore, all four edges of a tip member can be successively placed in position to engage the knife edge 58.

Having illustrated a preferred embodiment of the invention, it will be apparent that it permits of modification in arrangement and detail.

I claim:

1. In a rotary air-lock feeder including a cylindrical housing having a top inlet and a bottom outlet and a rotor mounted in the housing having a plurality of planar, straight edged impeller blades adapted to sweep the walls of the housing of the rotor rotates in the housing, the improvement comprising:

a shear knife mounted on said housing for engagement with the edges of said impeller blades as they rotate past said inlet, said shear knife comprising a body portion having an arcuate inner surface substantially concentric with said housing axis and a planar top surface lying in a plane defined by two perpendicular intersecting lines one of which lines is horizontal and perpendicular to a vertical plane through said housing axis, the other of said lines being inclined at an angle to the horizontal, said top surface intersecting said inner surface along a sharp edge whereby said sharp edge acts as a shear upon material projecting beyond a rotor blade edge and propelled by a blade upon such sharp edge.

2. Apparatus as set forth in claim 1 wherein said shear knife is adjustably mounted on said housing.

3. Apparatus as set forth in claim 1 wherein said arcuate surface is progressively further spaced from the path of said rotor blade edges in the direction of rotation thereof.

4. Apparatus as set forth in claim 1 wherein each rotor blade comprises a tip member removably secured thereto.